Figure 1:
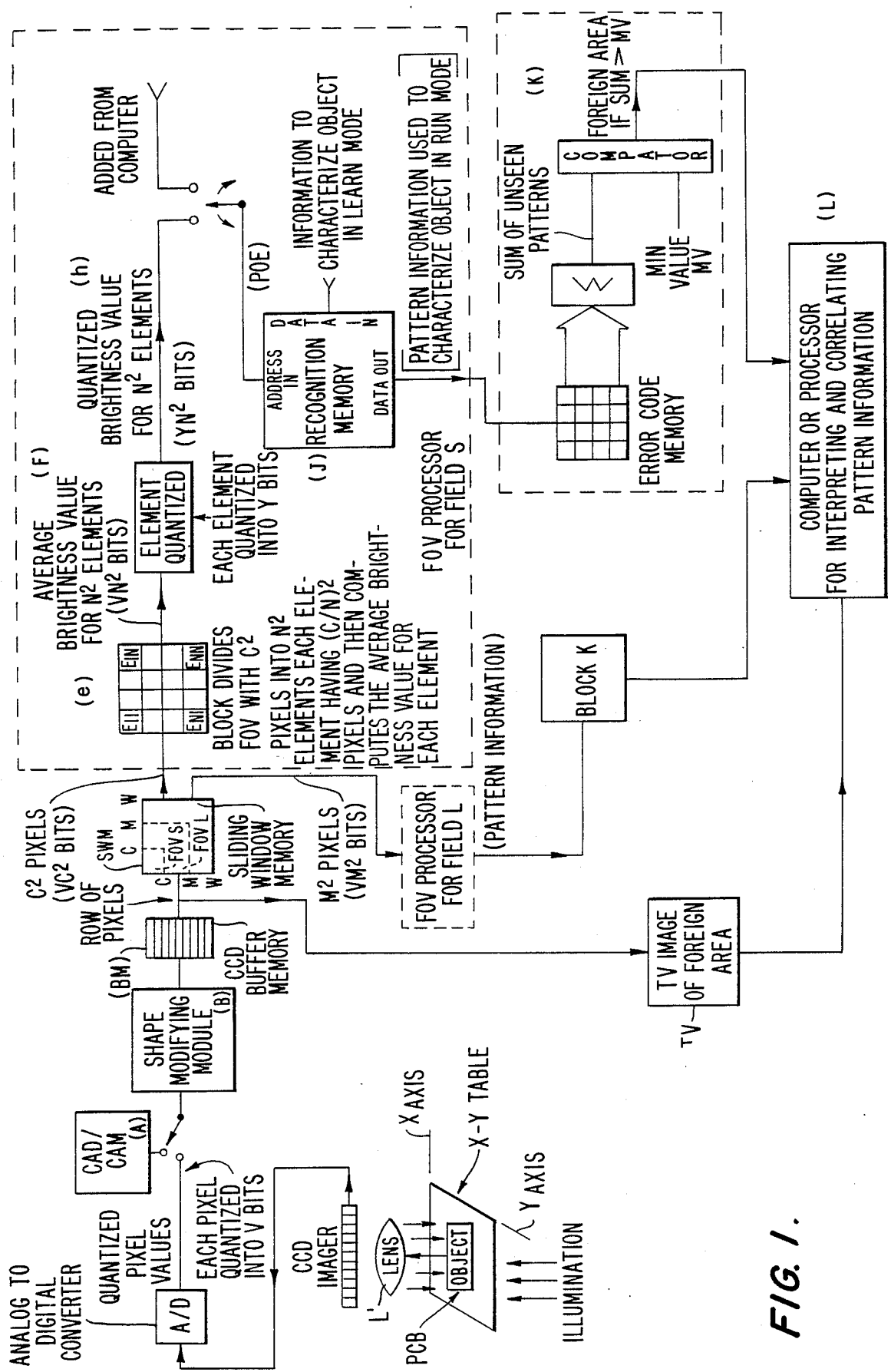

United States Patent [19]

Bishop

[11] Patent Number: 4,893,346

[45] Date of Patent: Jan. 9, 1990

[54] APPARATUS FOR AUTOMATICALLY INSPECTING OBJECTS AND IDENTIFYING OR RECOGNIZING KNOWN AND UNKNOWN PORTIONS THEREOF, INCLUDING DEFECTS AND THE LIKE, AND METHOD

[75] Inventor: Robert Bishop, Brookline, Mass.

[73] Assignee: Beltronics, Inc., Brookline, Mass.

[21] Appl. No.: 93,114

[22] Filed: Sep. 2, 1987

Related U.S. Application Data

[63] Continuation of Ser. No. 711,995, Mar. 14, 1985, abandoned.

[51] Int. Cl.$^4$ .............................................. G06K 9/00
[52] U.S. Cl. ........................................ 382/8; 382/14; 382/30
[58] Field of Search .......................... 382/8, 55, 14, 30; 358/101, 106

[56] References Cited

U.S. PATENT DOCUMENTS

| | | | |
|---|---|---|---|
| 3,987,412 | 10/1976 | Morrin, II | 382/55 |
| 4,006,296 | 2/1977 | Peterson | 358/106 |
| 4,450,579 | 5/1984 | Nakashima et al. | 382/8 |
| 4,477,926 | 10/1984 | Linger et al. | 382/8 |
| 4,549,206 | 10/1985 | Suzaki et al. | 358/106 |
| 4,556,903 | 12/1985 | Blitchington et al. | 358/106 |
| 4,589,140 | 5/1986 | Bishop et al. | 382/8 |
| 4,648,053 | 3/1987 | Fridge | 358/101 |

Primary Examiner—Leo H. Boudreau
Attorney, Agent, or Firm—Rines and Rines, Shapiro and Shapiro

[57] ABSTRACT

Apparatus and method for automatically inspecting objects and identifying or recognizing known and unknown portions thereof, including defects and the like, involving storing digital signal information representing an image of the desired predetermined object shapes to be learned by an image inspecting system and recognized during scanning of objects to be inspected, and modifying the stored digital signal information to create a fictitious image of the object shapes to be learned that incorporates acceptable size or dimension variations and the like in such objects such that during the inspecting of future objects, these acceptable variations will be ignored as defects or unknown elements.

29 Claims, 6 Drawing Sheets

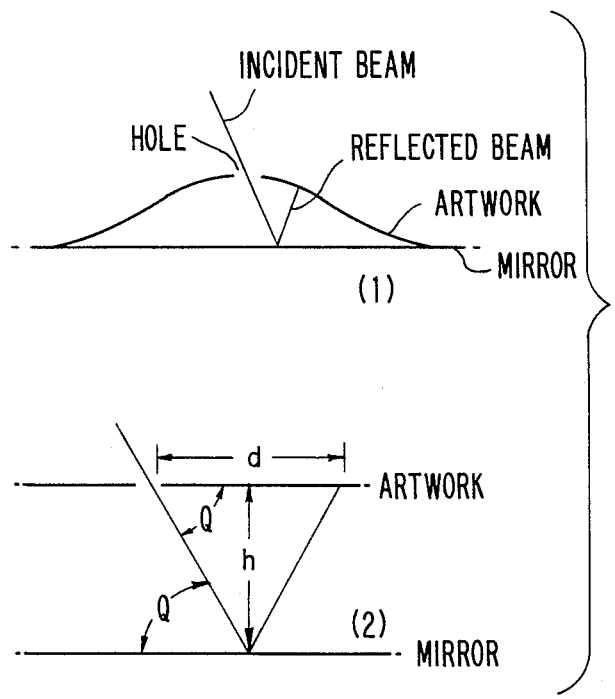
FIG. 6A.
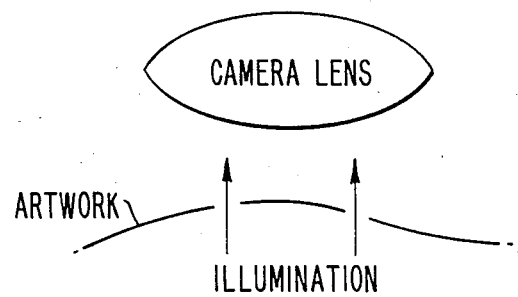
FIG. 6B.
FIG. 7.
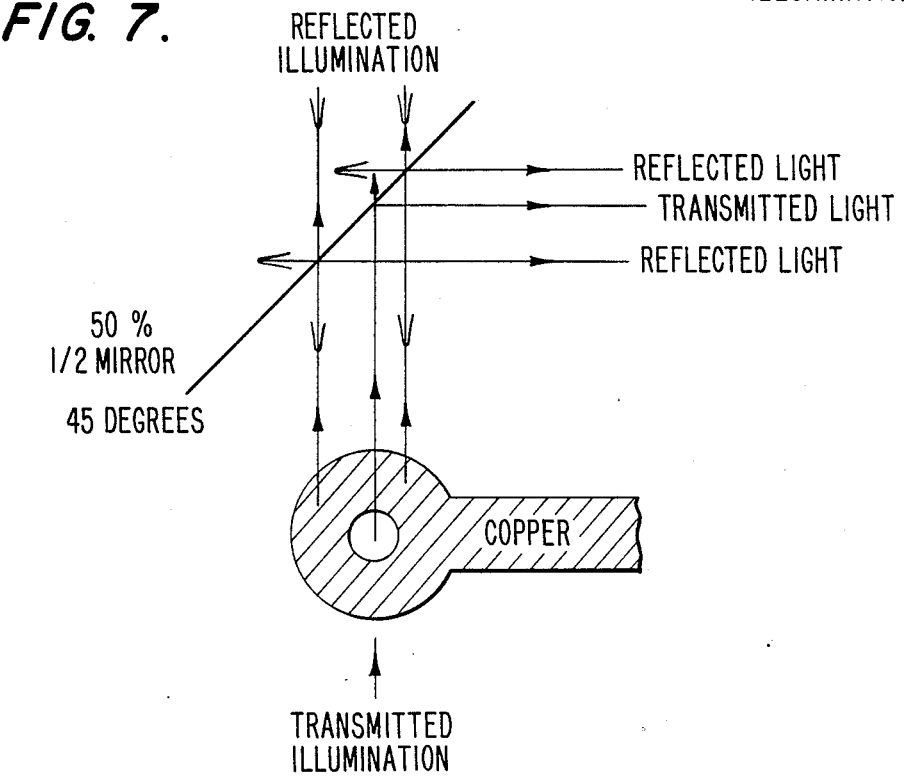

REFERENCE BOARD PICTURES | INSPECTED BOARD PICTURES

A1  LOC $X_1, Y_1$ HOLE

B1  LOC $X_1, Y_1$ HOLE

A2  LOC $X_2, Y_2$

B2  LOC $X_2, Y_2$

A3  LOC $X_3, Y_3$

B3  LOC $X_3, Y_3$

A4  LOC $X_4, Y_4$ HOLE

B4  LOC $X_4, Y_4$ HOLE

A5  LOC $X_5, Y_5$

B5  LOC $X_5, Y_5$

APPARATUS FOR AUTOMATICALLY INSPECTING OBJECTS AND IDENTIFYING OR RECOGNIZING KNOWN AND UNKNOWN PORTIONS THEREOF, INCLUDING DEFECTS AND THE LIKE, AND METHOD

This is a continuation application of Ser. No. 711,995 filed Mar. 14, 1985, now abandoned.

The present invention relates to improved methods of and apparatus for automatic real-time high-speed inspection of objects for such purposes as identifying known and unknown portions thereof, pattern recognition, defect identification, and the like.

A most satisfactory new approach to these problems is described in copending U.S. patent application Ser. No. 477,264, filed Mar. 21, 1983, now Pat. No. 4,589,140, issued May 13, 1986, for Method Of And Apparatus For Real-Time High-Speed Inspection of Objects For Identifying Or Recognizing Known and Unknown Portions Thereof, Including Defects And The Like, of Beltronics Inc., the assignee of the present application. The underlying process involved in the approach of said copending application will be subsequently summarized, the same differing from prior art and other current approaches to defect inspection and the like as applied, for example, to printed circuit boards and related applications (as described in said copending application) in the obviating of the requirements for pre-programming and software programming with image storing of each picture feature to be monitored, or the use of detailed masks and the like, including, if desired, with pre-calculation or programming of such criteria as minimum conductor line widths and similar criteria.

To the contrary, the approach of said copending application and the preferred application of the improvements of the present invention resides in causing the apparatus to "learn" the desired shapes in a "good" object, such as a reference printed circuit board, (as by actual scanning of a "good" object or by CAD/CAM or other signal input), and then to recognize deviations therefrom in real time scanning of future objects. Signals representing images of such an object or parts thereof at effectively different magnifications are presented to constant field of view (FOV) processors, one corresponding to each magnification and having its own respective memory. The shapes in the images are learned by storing the signals of the images in the respective memories. Objects to be inspected are scanned and the signals representing their images at said effectively different magnifications are presented to the corresponding processors. By comparing the stored signals with the last-named signals, a determination is made of shapes not previously learned, and thus defects are indicated.

The presentation at effectively different magnifications is effected by providing signals in memory corresponding to an image having the lowest magnification but with the resolution of the highest magnification, and extracting different portions of the image for the different magnifications, and quantizing the same into subelements that constitute the said constant field of view.

The signal images are also preferably perturbated at different magnifications by amounts small compared to the resolution element at the corresponding magnification to discriminate false errors from shapes not learned.

Consider the case, as an illustration, in which the inspection is to locate a break between a conductive pad and a conductor line on a printed circuit card or board or similar device. Initially, the board is scanned at high magnification until a break is detected. Upon detection, the magnification is decreased to determine whether the pad conductor configuration surrounds the break. To perform this task, the inspection correlates pattern information obtained at different magnifications of the same object area to identify certain patterns. In other situations, on the other hand, when the pattern of interest is larger than the FOV provided by the lowest magnification objective, the inspection involves viewing contiguous fields and combining pattern information from each field to identify the object.

There are two categories of operation to consider; those dealing with image acquisition and those dealing with image recognition. Image acquisition comprises:

1. Obtaining images of the object at one or more magnifications;
2. Constructing these images using the minimum number of required light levels; (In the inspection of a copper-conductor printed circuit board or card, the inspection is only concerned with the presence and absence of metalization and not with small variations in copper reflectivity; so the number of light levels of interest may be limited in order to facilitate the recognition process.); and
3. Dividing each image at each magnification into $N^2$ discrete receptor elements.

Image recognition comprises performing any number of combinations of the following operations to locate patterns of interest:

1. Examining the $N^2$ elements from each field at each magnification independently looking for a pattern of interest within each field;
2. Correlating patterns of the same object area generated at different magnifications;
3. Combining pattern information generated from contiguous fields at a single magnification; and
4. Performing recognition 3, above, at each of the different magnifications and correlating the obtained pattern information.

In applying this type of inspection philosophy to machine and electronic simulation or operation, as disclosed in said copending application, a first step (a) is performed of creating a high resolution large field (HRLF) image memory for simulation of FOV's at different magnifications. The field has an area coverage equal to that of a low magnification objective, but has the resolution of a high magnification. The field size is selected to accommodate the largest single pattern of interest. For a printed circuit board or card, this usually corresponds to a field size sufficient to store 1 ½ to 2 pads. It is interesting to note that if one attempted to store all the patterns in even a moderately sized HRLF image, an astronomical amount of memory would be required. For example, if the HRLF image contained only 32×32 pixels and each pixel was represented as a single binary bit, a total of:

$$2^{322} = 10^{154}$$

memory locations would be required. To eliminate this memory requirement and still accomplish the desired task, one proceeds in accordance with this inspection technique to (b) select FOV's that represent the desired magnifications; (c) divide each FOV into N×N elements; (d) set the brightness value of each element equal to the average brightness value of the pixels within the element; (e) quantize the brightness value of each element into the minimum number of light levels required to represent the pattern; and (f) use the quantized element values as the address to a recognition memory and store information about the pattern in the addressed location. If each element is quantized into b bits and there exists a total of $N^2$ elements, then the recognition memory would contain $2^{bN^2}$ locations.

At step (g), a separate recognition memory is used for each FOV. To inspect a printed circuit card, each element is quantized into two light levels to represent the presence or absence of metal within the element. This corresponds to $b=1$. For $b=1$, the table below lists the number of 64 K. memory chips required to store the $2^{N^2}$ patterns as a function of $N^2$.

| Number of Elements ($N^2$) | Number of Possible Patterns ($2^{N^2}$) | Number of 64 K Memories |
| --- | --- | --- |
| $3^2$ | $5.12 \times 10^2$ | 1 |
| $4^2$ | $6.55 \times 10^4$ | 1 |
| $5^2$ | $3.35 \times 10^7$ | 512 |
| $6^2$ | $6.87 \times 10^{10}$ | 1,048,576 |

To "learn" a new object for the first time, all the above operations are performed and a unique pattern of elements (POE) composed of $bN^2$ bits is generated for each FOV. Each POE is applied to the address lines of the recognition memory for the specific FOV. At each accessed address location, an identification code is entered to tell the memory that this pattern has been seen.

In the inspect mode, the object is scanned and operations (a) through (g) above are performed. The contents of each accessed memory location for each FOV is read to determine whether the pattern has been previously seen. If within a given area of the object a sufficiently large number of unseen patterns exists, the area is identified as foreign. This usually constitutes a defect when inspecting a printed circuit card in the above illustration.

There are occasions, however, where limited variations in conductor shapes or dimensions on the printed circuit board from those on the reference or standard or "good" circuit board or other object are entirely acceptable; and, though different from the learned shapes or dimensions, should accordingly not be flagged as a defect. As an example, thinner (or thicker) versions of learned shapes may be acceptable within predetermined ranges of tolerances from art work, such as later-described CAD/CAM data, or in etching the printed circuit boards (or other types of objects, more generically). Improvements in providing electronic flexibility automatically to teach the machine such allowable shape-dimension tolerances or permissible variations, and to enable improved art work defect detection itself and registration of the same, are thus principal objectives of the present invention.

An object of the present invention, accordingly, is to provide a new and improved method of and apparatus for automatic real-time high-speed inspection of objects that are not subject to the previously described limitations of other systems, but provide a universal approach to pattern recognition, defect identification and related problems, with the improved flexibility to embrace variations or deviations within predetermined limits in shape and/or dimensions of the patterns learned from reference or "good" object standards.

A further object is to provide a novel high-speed automatic recognition and identification method and apparatus operating under the inspection philosophy and technique described in said copending application with other improvements in object shape identification and other operational features including, but not limited to, acceptable printed circuit card via holes in conductive pads, and acceptable tolerances in registration or alignment.

Still a further object is to provide such a novel method and apparatus that is of more general utility and application, as well.

Other and further objects will be explained hereinafter, being more particularly delineated in the appended claims.

In summary, from one of its important aspects as applied to printed circuit boards and similar applications, the invention embraces a method of inspection of circuit board conductor shapes wherein digital signal information is stored representing shapes to be monitored in future board inspections, the method comprising, storing digital signal information representing an image of a desired predetermined object shape to be learned; predetermining at least one of acceptable size or dimension variations in such object shapes as conductor lines, interconnects, patterns and pads and acceptable hole and hole position variations in pads; modifying the stored digital signal information to create a fictitious image of said object shapes to be learned that incorporates the acceptable variations therein; storing the modified digital signal information representing said fictitious stored image; and, during the inspecting of future boards, ignoring said acceptable variations as possible defects by responding to recognition of the same in the said fictitious stored image. In another aspect, by comparison of coordinate location variations, registration or alignment can be checked. Other features of the invention and preferred and best mode embodiments, including preferred apparatus and constructional details, are hereinafter presented.

Figure 2:
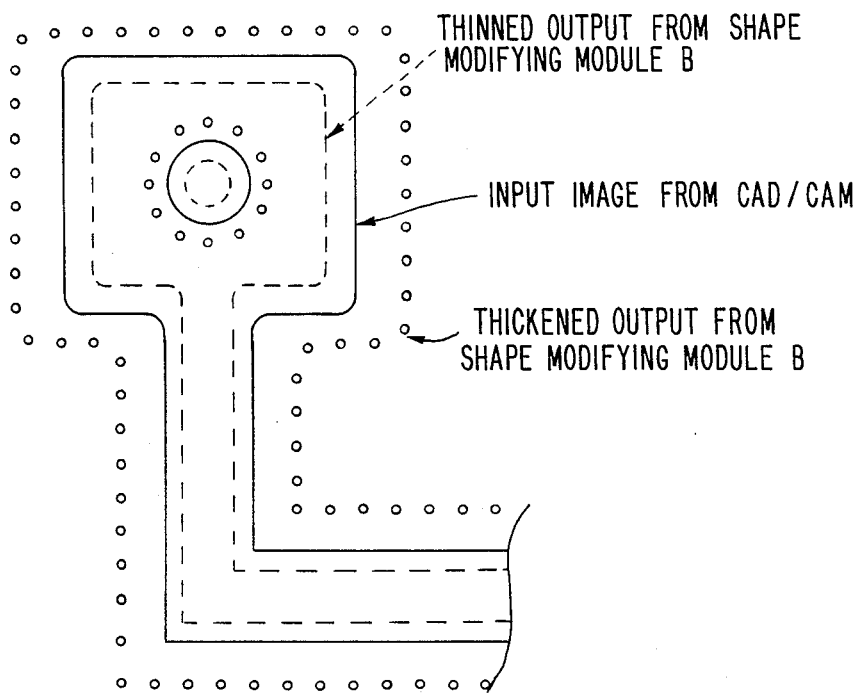
Figure 3:
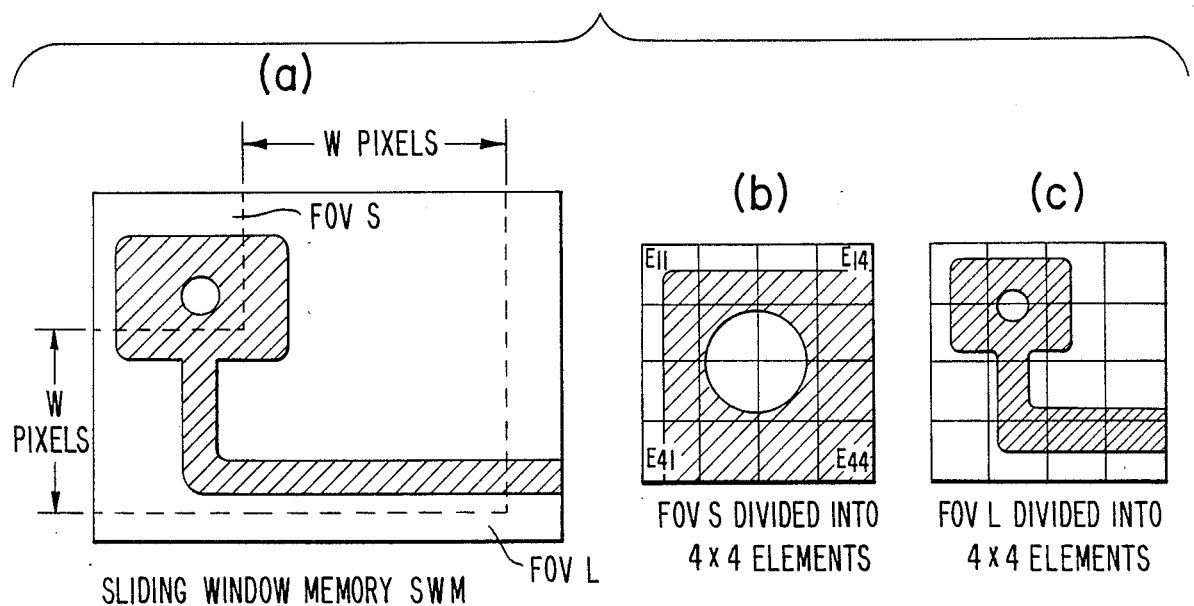
Figure 4:
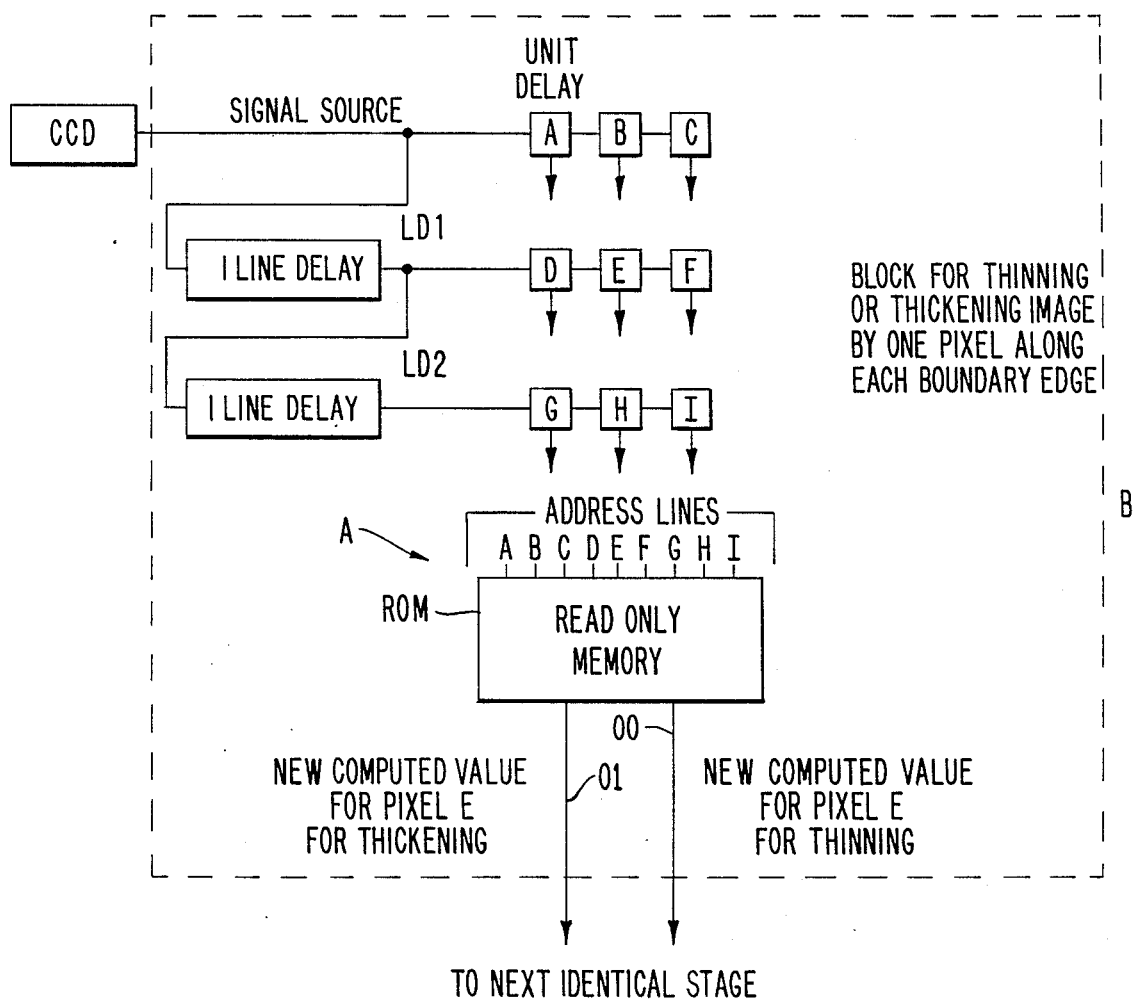
Figure 5:
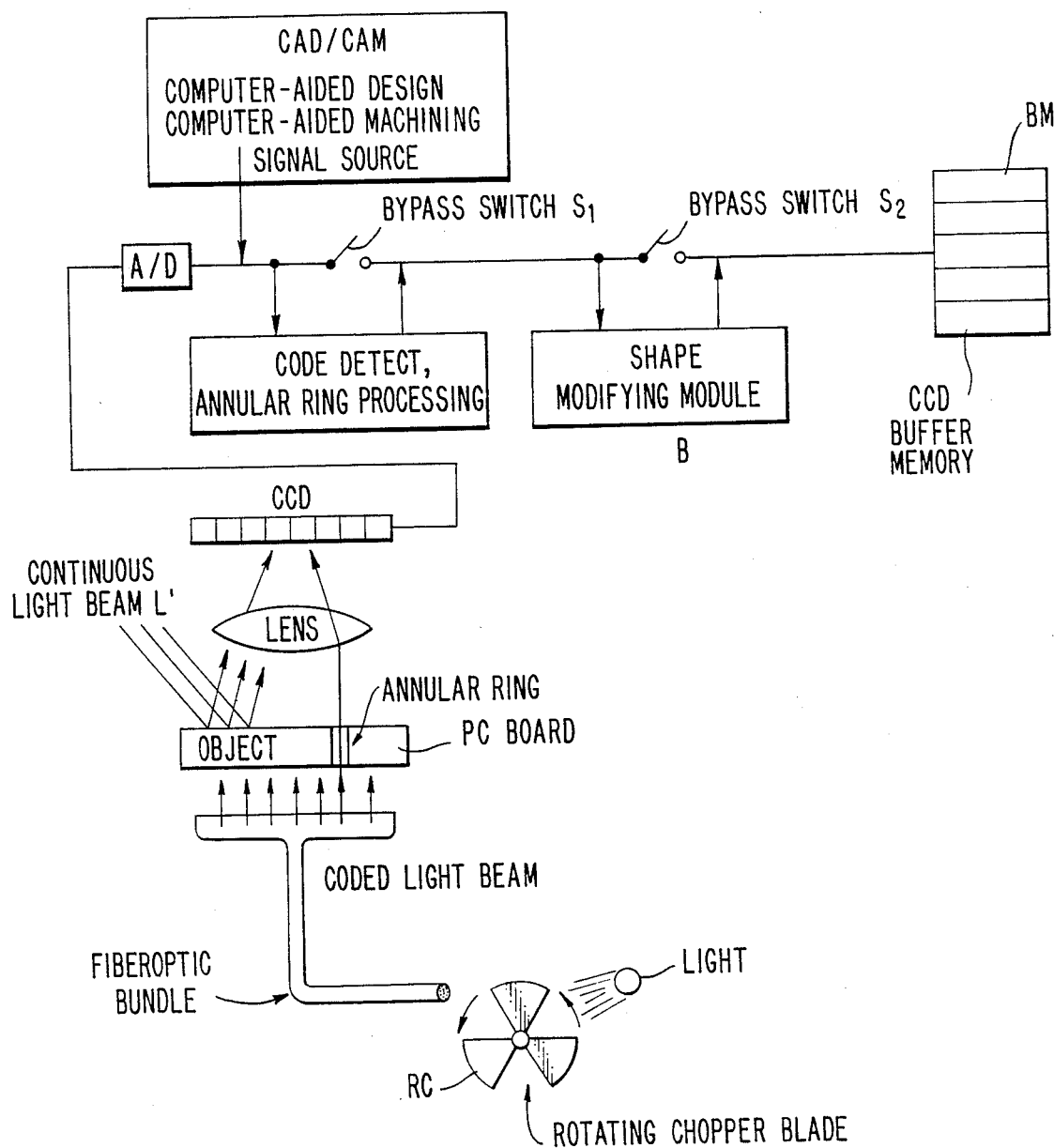
Figure 8:
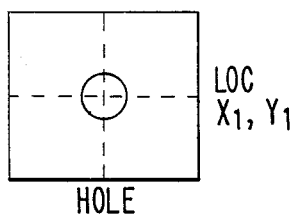
Figure 8:
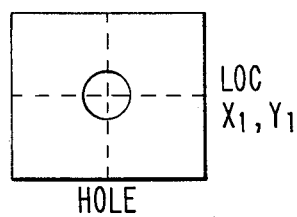
Figure 8:
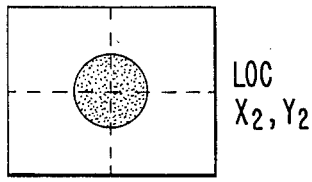
Figure 8:
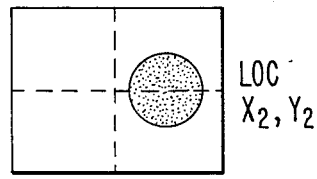
Figure 8:
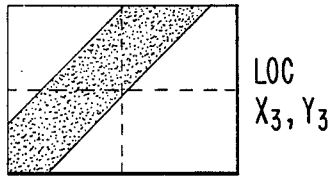
Figure 8:
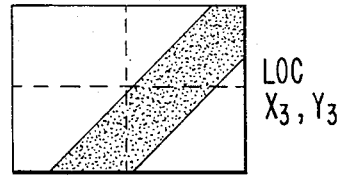
Figure 8:
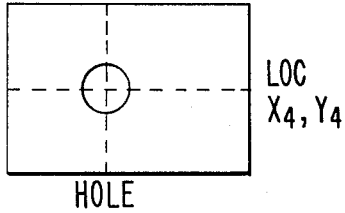
Figure 8:
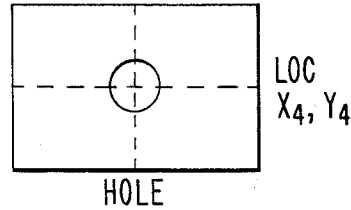
Figure 8:
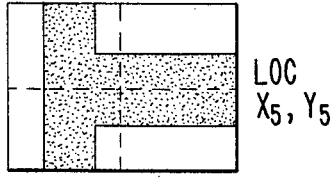
Figure 8:
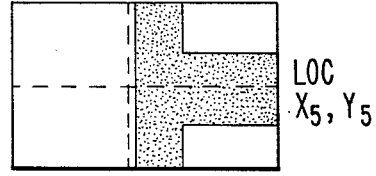

The invention will now be described with reference to the accompanying drawings, FIG. 1 of which is a combined block and circuit diagram illustrating a preferred inspection system operating in accordance with the above-described inspection technique and embodying the improvement features of the present invention;

FIGS. 2 and 3a, b and c are views of circuit board conductors and tolerances in dimensions of the same;

FIG. 4 is a block circuit diagram of a preferred subsystem for particularly advantageous use in the machine of FIG. 1 to enable the automatic learning of a range of dimensional variations or tolerances in learned shape images that are satisfactory to the inspection, such as, for example, variations in manufactured versions (such as printed circuit boards or other objects) from art work and the like;

FIG. 5 is a similar diagram of a modification for detecting via holes in PCB pads and the like and predetermined tolerances therein; and FIGS. 6A, B and 7 illustrate the use of reflected and back or transmitted light, respectively, particularly useful for PCB inspection with feed-through holes and the like; and FIG. 8 illustrates reference and inspected board pictures at particular x,y positions.

Considering FIG. 1, a system is illustrated constructed in the manner described in said copending application, with optical scanning of an area or a region of interest of an object PCB (abbreviation for the illustrative example of a printed circuit board), being shown as performed by a "CCD" imager, so labelled. Digitizing the scanned signals in real time is effected in an analog-to-digital converter A/D to produce successive trains of digital signals corresponding to the optical scanned lines. The digitized output of CCD is then transferred into a two-dimensional buffer memory BM and then into a sliding window memory SWM to create large field high resolution images. This technique enables the resolution to be equal to that obtained from high magnification objectives, while the FOV is equal to or greater than that obtained from low magnification objectives. In addition, object blurring can be totally eliminated by moving the object PCB in a plane (shown horizontal with X-Y coordinates) perpendicular to the axis of the CCD and reading out the CCD into the buffer memory BM each time the object image has moved a distance equal to one CCD element; which may, for example, be approximately 1/2000 of an inch. Specifically, the analog signal output of the CCD, after conversion to digital form by the A/D converter (which may be in the form of a conventional sampling pixel quantizer, so labelled) is transferred into the buffer memory BM (which can be modelled as a series of shift registers each equal in length to the number of CCD elements). The digital output of each shift register is connected to the input of the next register and also to one row of the sliding window memory SWM such that the image appearing in the window memory SWM is similar to what would be seen by moving a magnifying glass over the entire object. This is schematically illustrated within the block SWM by FOVS and FOVL (later described) seen in the window memory SWM, corresponding to high and low magnification, respectively.

The optical configuration incorporated in the system of FIG. 1 is extremely flexible. The image size of the object produced on the CCD can be magnified or demagnified (from $\frac{1}{3} \times$ to $3 \times$ using, for example, a photo lens $L^1$; $2 \times$ to $10 \times$ or $\frac{1}{2} \times$ to $1/10 \times$ using an imaging lens) by simply moving the relative positions of the CCD, lens $L^1$ and object PCB. Since the CCD is relatively very long (1728 pixels for a Reticon CCD apparatus, for example, and 2000 pixels for a Fairchild equipment) and each pixel is extremely small (0.64 mils for Reticon, 0.5 mils for Fairchild), a large variety of high resolution large field images are obtainable.

The operation of the system of FIG. 1 with the improvements of the present invention will now be explained for input signals generated from either the CCD imager or computergenerated CAD/CAM equipment. In the following example, the apparatus is taught the superimposed image of the two sides of the printed circuit board object PCB. Recognition codes are computed directly from signals supplied by the CAD/CAM system that designed the board. These codes are then compared with codes being generated from the CCD image signals as the CCD scans the printed circuit board and checking for front to back pattern registration.

To teach the machine the "good" or reference PCB pattern, digital signals from the CAD/CAM system A, FIG. 1, are supplied to the later-described shape-modifying module B. In accordance with the invention, this module B adds and/or deletes picture elements (pixels) along object boundaries within predetermined tolerances. Adding pixels serves effectively to thicken lines and pads; and deleting pixels, thins lines and pads. The number of pixels added or subtracted sets the range of allowable line width and pad dimension tolerances which may exist on the final PCB, such as the fictitious dashed or dotted outlines in the example of FIG. 2. These modified digital image signals are then learned by the apparatus, as later explained. For example, if up to a $\pm 2$ pixel tolerance is desired, images are learned at $\pm 0$, $\pm 1$ and $\pm 2$ pixels. These modified signals are generated in a sequential linear fashion representing consecutive lines of the image. A number of lines "L" are then stored in the before mentioned buffer memory BM (FIG. 1) to create a two dimensional image equal to the width of one CCD scan line.

From buffer BM, as previously described, the rows of pixels are fed to sliding window memory SWM of dimensional size $W \times W$ pixels, where $W > L$. In one preferred mode of implementation, the SWM may, for example, contain $32 \times 32$ pixels. FIG. 3a illustrates a typical image of a pad which would be contained within the SWM of such size. It is interesting to high-light at this juncture that if one were to attempt to store all the possible patterns that could be seen in an SWM of only $32 \times 32$ pixels, where each pixel is represented by a single binary bit, one would require, as previously stated, a total of $2^{322} = 10^{154}$ memory locations. To eliminate this memory requirement and still accomplish the desired task of recognizing all pattern types, the following functions are performed in accordance with the invention:

Function 1.

Divide the sliding window memory SWM into fields of view (FOV) of decreasing size and subdivide each FOV into $N \times N$ sections. Each section referred to as an element.

FIG. 3a illustrates the small and large field of view of FOV S and FOV L, respectively, previously referred to in connection with block SWM of FIG. 1, and FIGS. 3b and c illustrate the division of these two FOV's into $N \times N$ elements for $N = 4$.

The next function performed in accordance with the invention is:

Function 2.

Set the brightness value of each element equal to the average brightness value of the pixels contained in each element, and represent each average element value with V bits.

Functions 1 and 2 are both performed in block (e) of FIG. 1, illustrating $C^2$ pixels ($VC^2$ bits) applied from SWM, and the FOV with $C^2$ pixels divided into $N^2$ elements ($E_{11}-E_{1n}$, $E_{n1}$, $E_{nn}$) with each element having $(C/N)^2$ pixels. The average brightness value for each element is then computed and available at the output of (e), as shown.

The invention then utilizes element quantization at (f), FIG. 1, performing:

Function 3.

Quantize the average brightness value of each element represented by V bits into the minimum number of bits Y required to represent the pattern.

For example, in the inspection of objects such as PCB's, one is only interested in the presence and absence of metalized conductors on the board. If, therefore, more than 50% of the pixels contained in the spatial area of an element indicate the presence of metal, the entire element may be said to contain metal, and is accordingly quantized to the logical value 1. If this condition does not exist, the element is considered to be void of metal and is quantized to the logical value 0. In this example, of course, Y equals one bit.

The invention uses this quantized brightness value for address input in a recognition memory (j), FIG. 1, in performing the next step:

Function 4.

Use the $YN^2$ quantized element values, representing a unique pattern of elements labelled POE (upper-right, FIG. 1) as the address to a recognition memory (j) and store this information about the pattern in the addressed location. Given $YN^2$ bits, there exists $2^{YN^2}$ memory locations in the memory (j).

As before stated, in accordance with the invention a separate processing is employed for each different FOV as defined by:

Function 5.

Use a separate "FOV Processor" composed of an element computational unit (e), FIG. 1, element quantizer (f), and recognition memory (j), to process each FOV extracted from the sliding window memory SWM. (Note "FOV Processor For Field S" and block to left labelled "FOV Processor For Field L", etc.).

Under the technique of the invention, in order for the machine to "learn" the shapes of a new object for the first time, functions 1 through 5, above, are performed for each FOV extracted from the SWM, FIG. 1. A unique pattern of elements (POE) composed of $YN^2$ bits is generated for each FOV and is applied to the address lines ("ADDRESS IN" in FIG. 1) of the recognition memory (j) within each FOV processor. At each accessed memory location, an identification code is entered to indicate that that pattern has been learned. This may be referred to as Function 6.

In this example, the CAD/CAM system supplies signals to the inspection apparatus in a learn mode to describe the superposition of the front and back sides of the printed circuit board innerlayer for later inspection of registration. Fields of view (FOV) up to $W \times W$ pixels are extracted from sliding window memory SWM and the last-described operation (Function 6) is performed in each FOV processor.

Whether the CAD/CAM provided the learning signals or an actual CCD scan of a standard object, the apparatus is now ready for use in inspection—Function 7. The object under test is scanned, and operational functions 1 through 5, above, are performed. The contents of each accessed memory location in each FOV processor recognition memory is read to determine whether the pattern has been previously learned and addressed in recognition memory (j). If, within a given area of the object, a sufficiently large number of previously unseen or unlearned patterns exist, the area is identified as foreign or, for example, a defect.

To implement this foreign-area detection function, a two-dimensional error code memory is used, shown to the left in block (k) of FIG. 1. This memory stores codes read from the recognition memory (j) indicating whether patterns have been previously seen and learned. If, within the two-dimensional area covered by the memory, the number of unseen patterns exceeds a minimum predetermined number, shown summed and compared with the minimum MV in (k), FIG. 1, an image of the foreign area is then passed to a computer (L) for further identification, if such is desired.

In this illustrative example, a PCB innerlayer may be inspected for front-to-back pattern registration by placing the innerlayer on a glass top x-y table (to the left in FIG. 1), with illumination provided from beneath. The illumination passes through the innerlayer creating an image on the CCD which is the superposition of the two sides of the board. As the x-y table scans the image across the CCD, functions 1 through 5 and function 7, above, are performed. Upon detection of a foreign area, an image of the area is displayed on TV monitor TV, FIG. 1, and the x-y coordinates are recorded. If a sufficient number of foreign patterns exist, the two sides of the PCB innerlayer are considered to be mis-aligned.

Another application of the invention is the generation of drill tapes for automatic drilling of pads in the final PCB. In this application, a negative artwork containing the position of all pads serves as the OBJECT and is scanned on the x-y table with the illumination placed beneath the artwork. Images of pads are learned. The artwork is now rescanned with the apparatus placed in the inspect mode. Each time a pad is recognized, pad center coordinates are recorded (as at L) on a drill tape (not shown) which may later be used to drill the final PCB.

As before explained, one of the important improvements of this invention resides in the obviating of the necessity for "learning" and storing in memory all the tolerable variations in shapes and/or dimensions of "good" objects, such as PCB lines, pads, etc., through use of the shape-modifying module B of FIG. 1 which adds or removes picture elements (pixels) along all boundaries or perimeters to produce fictitious images of tolerable thick or thin versions of the actual image. Whereas a particular object thickness may have been learned, fictitious thinner or thicker versions (within acceptable tolerances) will be recognized as if they were the standard shape. It is in order, to describe a useful form of shape modifying module, illustrated in FIG. 4, for the case of a line thinning modifier B. Nine single unit delays A through I, two line delays LD1 and LD2, equal in length to that of the CCD, and one read-only memory ROM comprise the module. The signal input comes from the CCD of FIG. 1, which is then delayed by three unit delays at A, B and C. The output of the CCD is also delayed one line at LD1 and then fed into delay units D, E and F. In addition, the output of the first delay unit LD1 is delayed a second line in the line delay LD2, the output of which is applied to unit delays G, H and I, thus creating a three-by-three matrix or data block. The data arising from each of the delay units A, B, C, D, E, F, G, H and I is applied to corresponding address lines (bearing the same letters) to the read-only memory ROM. The contents of the read-only memory ROM is a new computed value with the center element of the three-by-three data block. One can select the proper output from the read-only memory ROM to indicate what the new computed value is; such that one output line 00 may be the data if one wants a thinner line image; or output line 01 if on wants to thicken the image line. If desired, to obtain thicker or thinner images, one may cascade circuits of the type of FIG. 4, with the output from a first such circuit acting as the input for the next circuit. The final circuit is then connected to the CCD buffer memory BM of FIG. 1.

Thus, by predetermining desired size variation in image shapes that are to be acceptable, the present invention enables electronically removing or adding pixel signals to the stored image to provide substitute stored fictitious, but acceptable, image information representing a different size of said object shape.

While for purposes of the illustrations previously presented the illumination of the object was described as from below the x-y table, clearly there are many useful applications for light reflection from above the object, as also described in said copending application. The concept of providing a range of different-dimensioned acceptable conductive lines or shapes is useful, of course, whether the object is being illuminated by reflection of light or, in the case of the camera negative artwork of the circuit board, or similar transparencies, by transmission of light from behind the artwork.

Returning to the case of artwork, it will hereinafter be shown that placing the artwork in the position of the object in FIG. 1, with back lighting, is most useful. Combinations of front and back lighting are also useful in PCB and other object inspection and registration applications. If lines, pads or other items on the front and back sides are unaligned relative to one another, and the machine has learned a good innerlayer while it was illuminated from behind and now, when inspecting a board, sees an irregular pattern resulting from the shift of the pattern on the front and back side, this previously unseen shifted pattern will be flagged as a defect.

Reflected and scattered lighting may be utilized to yield optimal results when processing PCB's and innerlayers without feed-through holes; and a combination of transmitted and reflected lighting may be incorporated for scanning innerlayers with feed-through holes; and transmitted lighting may be used for processing of artwork.

Transmitting light through the artwork ensures detecting defects such as pinholes and hairline cracks which would not be detected using conventional techniques that reflect light off a mirror placed behind the artwork. When artwork is placed on a mirror, light passing through a hole reflects off the mirror in a direction away from the hole such that the angle of incidence equals the angle of reflectance, FIG. 6A (1). If the artwork is not perfectly flat, the reflected beam could be blocked by the dark area around the hole thereby preventing detection of the defect. For example, if the artwork has a bump which raises it only 10 mils above the mirror (h=10 mils in FIG. 6A (2)) and the angle of light incidence Q equals 70 degrees, then a hole or break less than 7.28 mils would not be detected.

With the back-lighting method of the invention, FIG. 6B, the operation is not affected by small bumps and surface perturbations, thereby ensuring detection of all defects, enabling holes in various orientations along a bumpy section of artwork all to be detected by the light rays that travel through the holes and then directly toward the camera.

The optimal scanning configuration for artwork is therefore a hollow stage (x-y) with a clear lucite top in which the illuminating source is placed in a stationary position below the table, as in FIG. 1, to provide light rays perpendicular to the surface. The artwork is placed on the lucite top and suction is applied along at least two or more sides.

For inspecting innerlayers with feedthrough holes, the innerlayers may be illuminated from above and below to eliminate the hole from the image, as shown in FIG. 7, eliminating false errors due to perturbations in feedthrough hole positioning. Transmitted (back) illumination also permits back-to-front side registration to be checked. This is accomplished by increasing the intensity of the transmitted illumination source such that the light passes through the innerlayer lamination but is still blocked by the copper traces on the PCB board or the like. The superimposed front-to-back pattern can be learned and inspected as previously described.

There are problems in dimensional tolerance, shape and position detection that arise particularly in connection with through-board or via holes or the like in conductive pads or PCB's or in similar applications. Artwork and CAD/CAM data bases do not indicate or have via hole positions. Even if a via hole were indicated perfectly centered within a pad, in the final PCB, in practice, a via hole anywhere within the pad area is entirely acceptable, though deviating in shape and position from the centered hole of the "good" board. Such should not, therefore, be flagged as "defects".

Whereas for acceptable line thinning and thickening, fictitious "learned" images of lines thicker and thinner than the actually "learned" "good" object lines were created, a somewhat similar philosophy has proven an admirable solution to the via hole problem; i.e. fictitiously making a pad with an acceptable via hole look like a solid pad during the inspection process.

To enable inspection of boards with pads containing via holes (i.e. annular rings) without sacrificing the ability to detect pin holes, defect holes and pads with defective interiors, the method of the invention first uniquely identifies annular rings, checks them for proper formation and then disguises them during the inspection process to look like the solid pad of the original artwork. To accomplish this, it has been found desirable to illuminate the PCB simultaneously from both sides; reflecting a constant beam off the top surface, in FIG. 1, and transmitting a coded or otherwise distinctly different beam through the annular ring formed by the via hole in the pad and component holes in the board from the bottom of the board. This is more specifically shown in FIG. 5. The rendering of the bottom beam distinctively different from and thus "coded" with respect to the upper reflected beam is shown effected through a light-modulating rotating chopper RC, with the resulting pulsed beam being fed by a fiber optic bundle to a linear illumination head below the PCB object (which also serves to reduce heating effects by removing substantial infra-red energy, or other spectral band filtering may also be employed). Detection of the coded pattern at the output of the CCD image indicates the presence of a via annular ring or component hole (by-pass switch S1 open, FIG. 5). The ring of metalization surrounding the coded pattern is then examined for continuity ("annular ring processing"), and if, and only if continuity exists, pixels are effectively added to the center fictitiously to "fill-in" the entire hole during the inspection process, thus disguising the ring as a solid pad. If continuity is not found to exist, the ring is not "filled" and a defect is flagged.

Further in connection with hole detection and alignment problems, when PCB's are manufactured, they are produced using tooling holes at the perimeter of the board to hold the board during the fabrication process. The holes are used to align the board for drilling, projecting the conductor pattern onto the board and, once completed, to align multilayer boards relative to one another. One is interested in inspecting the locational relationship between the tooling holes, and PC pattern as well as the relationship between different conductors on the PC pattern. If either the pattern is shifted relative to the holes or part of the pattern is shifted relative to another part greater than a certain tolerance, there is an error.

To inspect a board for these purposes in accordance with the invention, one starts off with a known "good" reference board or artwork. The PCB is placed on the x-y scanner table of FIG. 1. At predetermined locations reference images are taken and stored, such as a reference hole at one coordinate position FIG. 8-A1, a pad at another FIG. 8-A2, a diagonal line FIG. 8-A3 at a third, and two intersecting lines FIG. 8-A5 at a fourth, etc.

To inspect another board to determine whether the board has the circuit conductors, interconnects, holes, or specifically the reference image (typically located at the extreme boundaries of the board) at the proper locations, the board is placed on the x-y table using the tooling holes to carefully register the table and the board. The board is scanned and images FIGS. 8-B1 and 8-B5 of the board are taken at the same coordinates of the x-y table as previously used for the reference images.

Since the holes drilled through the board (pictures B1 and B4 FIG. 8) agree with reference pictures A1 and A4, the holes in board B are positioned correctly; but the pad and conductor traces images B2, B3 and B5 are shifted to the right by 8 units indicating an error in the location of these conductors.

Though there may be correspondence between the reference drilled hole images and x-y location, if the line intersects, rings, etc. are shifted by more than a predetermined tolerance, there will be an indication of error in the location of these conductors.

Further modifications will also occur to those skilled in this art, including implementation of components and sub-assemblies of FIG. 1 in a manner similar to that described in said copending application and the systems therein referenced, it clearly being understood that the exemplary explanations for PCB's are illustrative only and that the techniques of the invention are readily adaptable to other inspection problems as well and such are considered to fall within the spirit and scope of the invention as defined in the appended claims.

What is claimed is:

1. A method of inspection of circuit board conductive shapes wherein digital signal information is stored representing desired shapes to be monitored in future board inspections, the method comprising, originally storing digital signal information representing images of desired predetermined object shapes to be learned; predetermining at least one of acceptable size or dimension variations in such object shapes; modifying the stored digital signal information to create a set of fictitious images of said object shapes to be learned that incorporates the acceptable variations therein; storing the modified digital signal information representing said fictitious images; and, during circuit board inspections, ignoring said acceptable variations as possible defects by responding to recognition of the acceptable variations in the said fictitious stored images.

2. A method as claimed in claim 1 and in which the said modifying of the originally stored digital signal information as to said size or dimension variations is effected by electronically removing or adding pixel signals to the stored digital signal information to represent a different size or dimension of the object shape.

3. A method as claimed in claim 1 and in which the said originally stored digital signal information includes information as to a conductor pad in which there may be a via hole, and further comprising monitoring the annular nature of a pad detected during said circuit board inspections to insure that a detected hole therein is an acceptable via hole, and, if the detected hole is an acceptable via hole, electronically adding pixel signals to the stored digital signal information in effect to fill in the detected hole to present a fictitious image of a solid conductor pad.

4. A method as claimed in claim 3 and in which said monitoring includes detecting both light reflected from the upper surface of the board and light transmitted through the annular pad from below the board.

5. A method as claimed in claim 4 and in which the light transmitted from below the board is coded to distinguish the same from that reflected from the upper surface of the board.

6. A method as claimed in claim 1 and in which the stored digital signal information includes information representing desired patterns and positions to be monitored in future board inspections, and wherein said method includes inspecting circuit boards to determine the presence of differences from said desired patterns and positions beyond predetermined tolerances, indicating such differences as defects, determining the x-y coordinate locations of such defects, producing separate pictures of local regions of inspected boards at which such defects are located, and producing accompanying recordings of the x-y coordinate locations of such defects.

7. Apparatus for inspection of circuit board conductive shapes wherein digital signal information is stored representing desired shapes to be monitored in future board inspections, the apparatus having, in combination, means for storing digital signal information originally representing images of desired predetermined object shapes to be learned; means for predetermining at least one of acceptable size or dimension variations in such object shapes; means for modifying the stored digital signal information to create a set of fictitious images of said object shapes to be learned that incorporates the acceptable variations therein; means for storing the modified digital signal information representing said fictitious images; and means operable during circuit board inspections, for ignoring said acceptable variations as possible defects by responding to recognition of the acceptable variations in the said fictitious stored images.

8. Apparatus as claimed in claim 7 and in which the said means for modifying the originally stored digital signal information as to said size or dimension variations is provided with means for electronically removing or adding pixel signals to the stored digital signal information to represent a different size or dimension of the object shape.

9. Apparatus as claimed in claim 7 and in which the said originally stored digital signal information includes information as to a conductor pad in which there may be a via hole, and said apparatus is provided with means for monitoring the annular nature of a pad detected during said circuit board inspections to insure that a detected hole therein is an acceptable via hole, and means for electronically adding pixel signals to the stored digital signal information representing an acceptable via hole in effect to fill in the hole to present a fictitious image of a solid conductor pad.

10. Apparatus as claimed in claim 9 and in which said means for monitoring includes means for detecting both light reflected from the upper surface of the board and light transmitted through the annular pad from below the board.

11. Apparatus as claimed in claim 10 and in which means is provided for coding the light transmitted from below the board to distinguish the same from that reflected from the upper surface of the board.

12. An apparatus as claimed in claim 8, and which the said means for electronically removing or adding pixel signals comprises delay line means connected to receive digital signal information to be stored and delay units connected to the delay line means and to address line inputs of read only memory means to create a matrix of delayed pixel signals, and means for outputting from the read only memory means new computed values representing the removal or adding of pixel signals at a boundary edge of a stored image.

13. Apparatus as claimed in claim 7 in which said means for storing digital signal information stores digital signal information representing desired patterns and positions to be monitored in future board inspections, and in which said apparatus includes means for inspecting circuit boards to determine the presence of differences from said desired patterns and positions beyond predetermined tolerances and for indicating such differences as defects, means for determining the x-y coordinate locations of said defects, means for producing separate pictures of local regions of inspected boards at which said defects are located, and means for producing accompanying recordings of the x-y coordinate board locations of said defects.

14. A method of inspection of circuit board conductor shapes wherein digital signal information is stored representing shapes to be monitored in future board inspections, the method comprising, storing digital signal information representing an image of a predetermined object shape to be learned; predetermining size variations in said shape that are acceptable to the inspection; electronically removing or adding pixel signals to the stored image information to provide modified digital signal information representing a set of images corresponding to different sizes of said object shape, and storing said modified digital signal information.

15. A method as claimed in claim 14 and in which the further steps are performed of scanning further boards to be inspected and detecting signal information at the top of said board corresponding to the object shapes on the board, and recognizing the predetermined shapes within the limits of the stored said different size.

16. A method as claimed in claim 14 and in which said object shape comprises a linear strip and the said electronically removing pixel step provides stored image information of a thinner linear strip acceptable to the inspection process.

17. A method as claimed in claim 14 and in which said object shape is of a curved form and the said electronically adding pixel step provides stored image information of a larger curved form acceptable to the inspection process.

18. A method as claimed in claim 17 and in which said objects comprise discs or pads, one disposed on each side of a translucent or light-transmitting surface in substantial vertical alignment, and the further step is performed of generating a strip of substantially uniform-intensity light beneath said surface, removing infra-red or other spectral energy from said light, and thereafter directing the remaining light through said surface from a position adjacent the rear side of said surface; said electronically adding pixel step providing stored image information of a larger disc or pad corresponding to acceptable variation in vertical mis-alignment of the discs of pads on opposite sides of said surface.

19. A method as claimed in claim 18 and in which said discs or pads are conductive pads and said translucent surface is a circuit board mounting said pads.

20. A method of inspection of circuit board conductive shapes wherein digital signal information is stored representing desired shapes to be monitored in future board inspections, the method comprising originally storing digital signal information representing images of desired predetermined object shapes, said information including information as to a conductor pad in which there may be a via hole; and, during the inspecting of boards, monitoring the annular nature of a detected pad to insure that any detected hole therein is an acceptable via hole, and, if the detected hole is an acceptable via hole, electronically adding pixel signals to the stored digital information in effect to fill in the hole to present a fictitious image of a solid conductor pad.

21. A method as claimed in claim 20 and in which said monitoring includes detecting both light reflected from the upper surface of an inspected board and light transmitted through a pad from below the board.

22. A method as claimed in claim 21 and in which the light transmitted from below the board is coded to distinguish the same from that reflected from the upper surface of the board.

23. Apparatus for inspection of circuit board conductive shapes wherein digital signal information is stored representing desired shapes to be monitored in future board inspections, the apparatus having, in combination, means for storing digital signal information representing images of desired predetermined object shapes and including signal information as to a conductor pad in which there may be a via hole, means operable during the inspecting of boards for monitoring the annular nature of a detected pad to insure that any hole detected therein is an acceptable via hole, and means for electronically adding pixel signals to the stored digital signal information representing a detected acceptable via hole in effect to fill in the hole to present a fictitious image of a solid conductor pad.

24. Apparatus as claimed in claim 23 and in which said means for monitoring includes means for detecting both light reflected from the upper surface of an inspected board and light transmitted through a pad from below the board.

25. Apparatus as claimed in claim 24 and in which means is provided for coding the light transmitted from below the inspected board to distinguish that light from light reflected from the upper surface of the inspected board.

26. A method of inspection of circuit board conductive patterns and positions wherein digital signal information is stored representing desired patterns and positions to be monitored in subsequent circuit board inspections, the method comprising, storing digital signal information representing desired patterns and positions, inspecting circuit boards to determine the presence of differences from said desired patterns and positions beyond predetermined tolerances, indicating such differences as defects, determining the x-y coordinate locations of said defects, producing separate pictures of local regions of circuit boards at which said defects are located, and producing accompanying recordings of the x-y coordinate locations of said defects.

27. A method as claimed in claim 26, comprising employing an x-y coordinate table and said pictures to locate said defects.

28. Apparatus for inspection of circuit board conductive patterns and positions wherein digital signal information is stored representing desired patterns and positions to be monitored in subsequent board inspections, the apparatus having, in combination, means for storing digital signal information representing desired patterns and positions, means for inspecting circuit boards to determine the presence of differences from said desired patterns and positions beyond predetermined tolerances and for indicating such differences as defects, means for determining the x-y coordinate locations of said defects, means for producing separate pictures of local regions of circuit boards at which said defects are located, and means for producing accompanying recordings of the x-y coordinate locations of said defects.

29. Apparatus as claimed in claim 28 and in which said apparatus includes an x-y coordinate table employing said pictures to locate said defects.

* * * * *